United States Patent [19]

Herczog et al.

[11] 3,850,764
[45] Nov. 26, 1974

[54] METHOD OF FORMING A SOLID TANTALUM CAPACITOR

[75] Inventors: Andrew Herczog, Painted Post; Joseph M. Power, Corning; James W. Smith, Painted Post, all of N.Y.

[73] Assignee: Corning Glass Works, Corning, N.Y.

[22] Filed: Apr. 11, 1974

[21] Appl. No.: 459,878

[52] U.S. Cl............... 204/38 A, 204/35 N, 204/42, 204/56 R, 29/25.41, 117/200, 317/230
[51] Int. Cl......................... C23f 17/00, H01g 9/16
[58] Field of Search .... 204/35 N, 38 R, 38 A, 38 S, 204/42, 56; 117/200; 317/230

[56] References Cited
UNITED STATES PATENTS

| | | | |
|---|---|---|---|
| 3,299,325 | 1/1967 | Wagener et al.................. | 317/230 |
| 3,653,119 | 4/1972 | Fresia et al........................ | 29/585 |
| 3,801,479 | 4/1974 | Nishino et al..................... | 204/37 |

Primary Examiner—John H. Mack
Assistant Examiner—Aaron Weisstuch
Attorney, Agent, or Firm—Walter S. Zebrowski; Clarence R. Patty, Jr.

[57] ABSTRACT

A method is disclosed for forming a solid tantalum capacitor wherein the cathode is manganese dioxide formed by pyrolysis. The first pyrolysis is performed at a temperature of between 225°C and 300°C while all subsequent pyrolysis treatments are at a temperature of between 175°C and 225°C with each such subsequent pyrolysis temperature being at least 25°C less than the first pyrolysis temperature.

8 Claims, 3 Drawing Figures

METHOD OF FORMING A SOLID TANTALUM CAPACITOR

BACKGROUND OF THE INVENTION

1. Field of the Invention

The present invention relates to a method of making solid tantalum capacitors wherein the anode is a porous tantalum slug.

2. Description of the Prior Art

An important step in the manufacturing of solid tantalum capacitors is the deposition of manganese dioxide electrodes on the surface of anodically oxidized, partly sintered, porous tantalum metal. The tantalum pellet or slug is provided with a tantalum wire attached thereto by being fused-in, or otherwise, which tantalum wire is used for the anodic lead wire connection. The manganese dioxide coating, which is superimposed with exterior carbon and silver coatings for example, is used for the cathodic connection of the capacitors. The manganese dioxide deposit is produced inside the pores of the anodized metal by repeated steps of impregnation and pyrolysis of manganese nitrate. This is followed by a reanodizing treatment which is used to reduce leakage current which increases as a result of the manganese dioxide deposition treatments. In the process of making solid tantalum capacitors, reanodizing was used at least once. Ordinarily, reanodization is performed two or three times. A typical process characteristic of the prior art consists of three manganese dioxide depositions followed by reanodization, then two manganese dioxide depositions and reanodization, and finally two more manganese dioxide depositions and reanodization. Manganese dioxide is deposited by thermal decomposition, pyrolysis, of manganese nitrate which is introduced into the porous body of the anodized tantalum as a concentrated aqueous solution. Pyrolysis is obtained by holding the impregnated anodes in any furnace having a temperature of 250°C or higher for several minutes. A rough scale is formed on the exterior of the anodes processed in this manner, which scale has to be removed mechanically in order to fulfill dimensional requirements of the finished capacitor. This operation, called sizing, is necessary although it is quite undesirable because it may damage the capacitors and is considered to be a factor responsible for low yield in manufacturing.

While sizing is undesirable, a more important problem with capacitors made by the prior art is their low voltage efficiency in terms of the product capacitance times rated voltage divided by the weight of the tantalum used in the capacitor. This efficiency is called CV rating. In order to increase this efficiency, a tantalum powder of high specific surface area, lightly sintered to the desired shape of the anode is used. This approach is limited, however, because the electrical connection between poorly sintered tantalum particles becomes tenuous causing high electrical resistance which leads to a high dissipation factor of the capacitor.

Another source of poor efficiency in such capacitors is derating of their use voltage with respect to the forming, original anodizing, voltage. The thickness of anodic tantalum oxide film increases in proportion to the forming voltage while the capacitance decreases with increasing oxide thickness. Wet tantalum capacitors can be used at or near the forming voltage because any defect in the oxide film is "healed" by the action of the electrolyte under a DC bias applied to the anode. Solid electrolyte capacitors, having manganese dioxide electrodes, do not have this capacity and would break down irreversibly if exposed to the full formation voltage. Therefore, the voltage rating of solid tantalum capacitors is usually only one-fourth to one-third of the forming voltage. This means that the efficiency in terms of CV rating for a given anode material is limited to 25 percent to 33 percent of the theoretical value. It is generally assumed that this loss of efficiency is caused by damage suffered by the anodic oxide film during the pyrolytic deposition of manganese dioxide. This consideration appies mainly to low voltage capacitors, for example 35 volts or less, where high area efficiency is used to maximize the CV rating independently from the damage suffered during processing. At high use voltage the purity of the dielectric film and its resistance to crystallization become additional factors of great importance for obtaining high efficiency, not dealt with in the present invention.

Summary of the Invention

The objects of this invention are to provide a method of making high efficiency solid tantalum capacitors in which the need for sizing is eliminated, the damage suffered by the dielectric film during deposition of manganese dioxide electrodes is reduced, and which overcomes the heretofore noted disadvantages.

Broadly, according to the present invention, a porous tantalum slug is anodized to form a dielectric layer thereon. A coating of manganese nitrate is deposited over the dielectric layer and the composite so formed is heated in an oven at a temperature of between 225°C and about 300°C for a period of time sufficient to convert manganese nitrate to a layer of manganese dioxide. This composite is then subjected to reanodization. Thereafter, more manganese nitrate solution is applied over the surfaces of the porous composite which is then reheated in the oven at a temperature of between 175°C and 225°C for a period of time sufficient to convert the second coating of manganese nitrate to manganese dioxide, with the reheating temperature being at least 25°C less than the first heating temperature. This step may be repeated a few more times to produce as much manganese dioxide as desired on the surface of the porous anode. The process is finished by a reanodization treatment.

Additional objects, features, and advantages of th present invention will become apparent to those skilled in the art, from the following detailed description and the attached drawings on which, by way of example, only the preferred embodiment of this invention is illustrated.

DETAILED DESCRIPTION

It is to be noted that the drawings are illustrative and symbolic of the invention, and there is no intention to indicate scale or relative proportion of the elements shown therein. For purposes of simplicity, the present invention will be described in connection with the manufacture of a solid tantalum capacitor.

Figure 1:
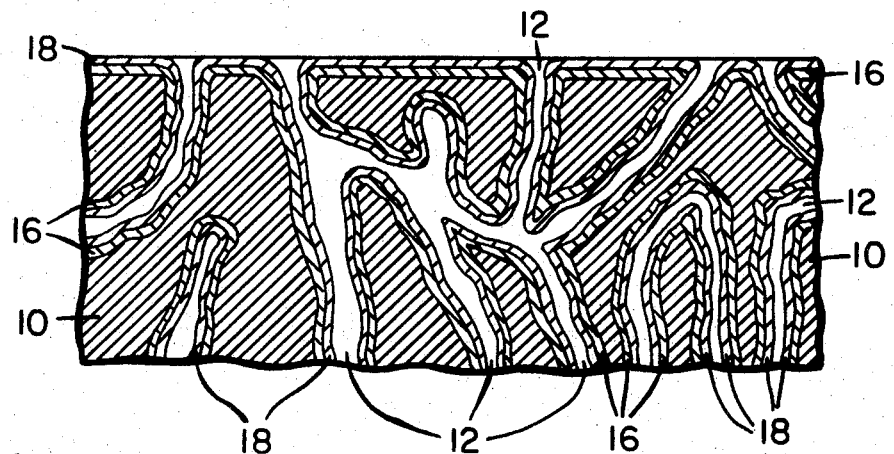
FIG. 1 is a fragmentary cross-sectional view of a porous tantalum slug having dielectric and cathodic layers applied thereto.

Referring to FIG. 1, there is shown a fragmentary cross-sectional portion, greatly enlarged, of porous tantalum slug or pellet 10. Slug 10 is forrmed of a quantity of particulate tantalum material sintered together so as to leave a number of openings and passages 12 between particles. While the particles are being sintered, a tantalum lead, such as lead 14 shown in FIG. 2, may be disposed within the tantalum particles and sintered therein, or may be electrically welded or otherwise attached to slug 10 after sintering. The tantalum slug thus formed is ready for having a dielectric layer 16 formed thereon. Dielectric layer 16 is formed by anodizing. Anodization consists of placing slug 10 into an anodizing bath, such as one consisting of 0.1n nitric acid. A DC current is then passed through the bath and pellet to form a layer of $Ta_2O_5$ on the surface of the tantalum which will form dielectric layer 16. Anodization of tantalum is well known in the art and a layer of $Ta_2O_5$ having the desired thickness can be readily formed by one familiar with the art.

A concentrated aqueous solution of manganese oxide is then introduced into the porous body of the anodized tantalum slug by dipping the slug, either cold or preheated to between 100°C. and 150°C., in the solution, allowing time for the solution to penetrate the porous body which, for example, may take 1 to 30 seconds for ordinary sized slugs. A suitable concentration of an aqueous solution of manganese nitrate for this purpose has a density of about 1.6 and is a 50 to 52 percent by weight solution. After the manganese nitrate solution is introduced into the porous body, the body is placed into a furnace at a temperature of between 225°C. and about 300°C. for a period of time sufficient to convert the manganese nitrate to a layer of manganese dioxide. The time necessary for this conversion depends on the furnace temperature, heat transfer rate and atmosphere but generally is between about 3 to 5 minutes. The preferred furnace temperature for this treatment is about 250°C.

After this pyrolysis treatment, the leakage current is generally high and is believed to be caused by damage suffered by the dielectric film during the pyrolytic deposition of the manganese dioxide. In order to reduce this leakage, the composite so formed is reintroduced into an anodization bath, such for example as $3 \times 10^{-4}N$ nitric acid, and subjected to a DC current. It has been found that this procedure in all cases greatly decreases the leakage current.

This composite is then reimpregnated with manganese nitrate as heretofore described and placed in a furnace having a temperature of between 175°C and 225°C for a time sufficient to convert successive coatings of manganese nitrate to manganese dioxide. It has been found that, to obtain the improved properties resulting from the method of the present invention, the reheating furnace temperature must be at least 25°C less than the first heating temperature. The reimpregnation of the composite with manganese nitrate and pyrolysis is repeated as many times as is necessary to form a suitable thickness of manganese dioxide film 18 on the pore and slug surfaces.

Figure 2:
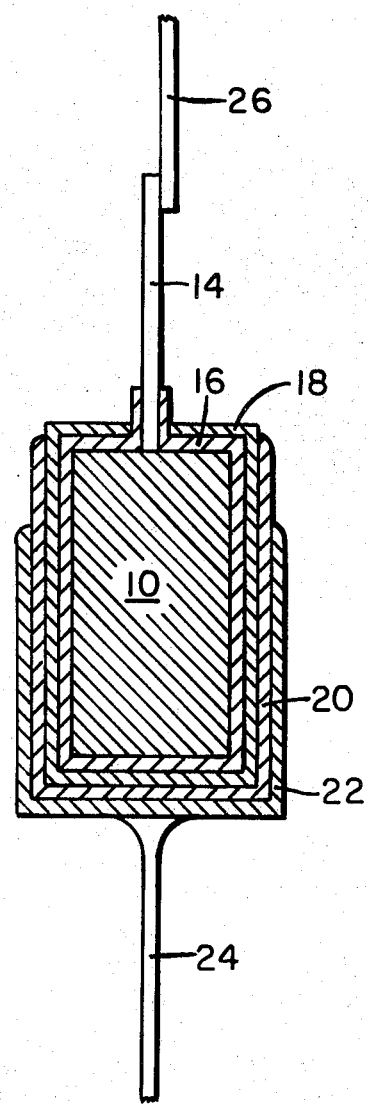
FIG. 2 is a cross-sectional view of a completed solid tantalum capacitor ready for encapsulation.

Referring to FIG. 2, there is shown slug 10 with dielectric layer 16 and manganese dioxide film 18 formed thereon. Since a lead cannot be readily attached to manganese dioxide film 18, a layer of carbon 20 is applied over the cathodic manganese dioxide film, and a layer of silver 22 is applied over the carbon layer. The application of the carbon layer and silver layer is well known in the art and does not form a part of the present invention but is described simply to show how lead 24 may thereafter be attached to the manganese dioxide film. Lead 24 may be soldered, or otherwise attached to the silver film.

To this assembly, an exterior lead 26 is attached to tantalum lead 14 in the manner and for the purposes well known in the art. The article so formed is then ready for encapsulation by any suitable means.

Figure 3:
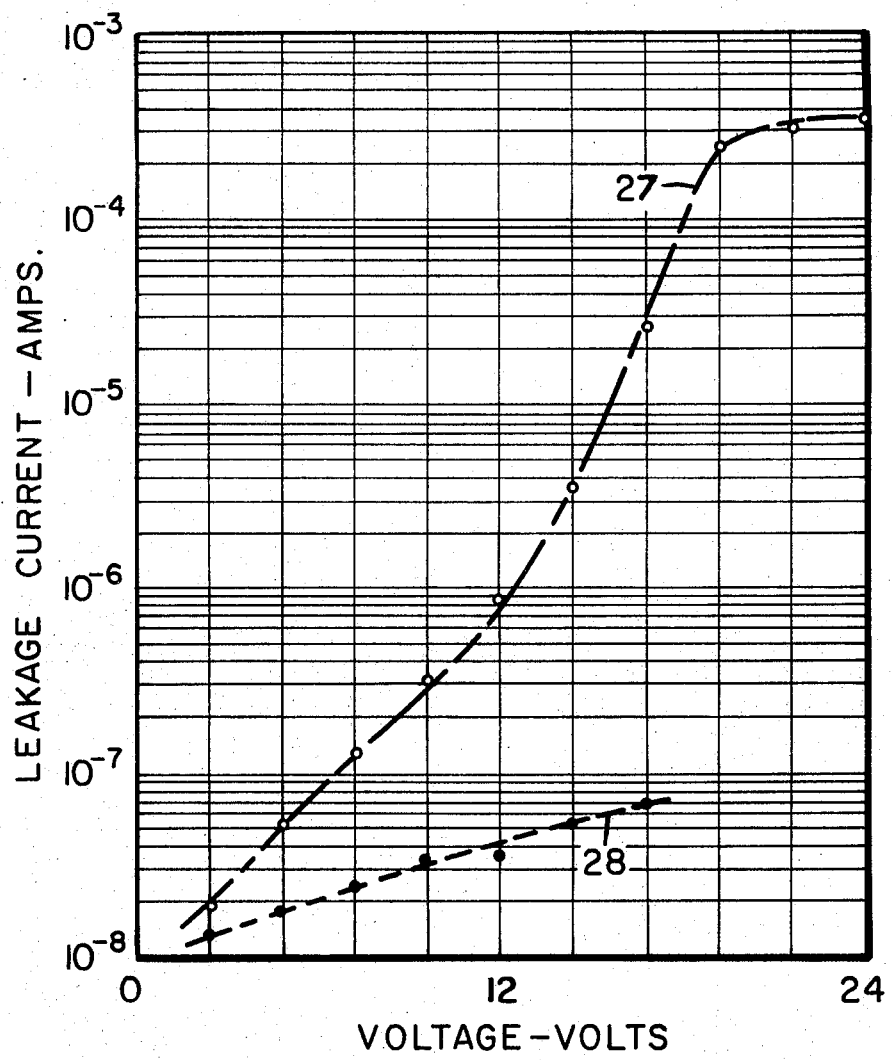
FIG. 3 is a graph illustrating the greatly reduced leakage current of a solid tantalum capacitor formed by the present method as compared to the prior art.

It has been found that through the use of the present method, greatly improved properties of solid tantalum capacitors may be obtained as illustrated in FIG. 3 wherein curve 27 illustrates the current leakage of prior art capacitors whereas curve 28 illustrates a capacitor formed by the present method. FIG. 3 showos nearly a 10 fold improvement in the DC leakage current of capacitors processed by the present method wherein the first pyrolysis temperature is between 225°C and 300°C while all subsequent temperatures are between 175°C and 225°C with the subsequent temperatures being at least 25°C less than the first pyrolysis temperature. Furthermore, the capacitors formed in accordance with the present method show little or no scale formation, therefore, require no sizing.

As a typical example, a tantalum slug or pellet having a weight 0.295 grams is obtained by sintering a quantity of tantalum powder at a temperature of 1,900°C for about 20 minutes. The pellet is then anodized in a dilute nitric acid solution having a concentration of 0.1N at 42.5 volts DC to form an anodic oxide, $Ta_2O_5$. This composite is then impregnated with a 50 percent by weight aqueous solution of manganese nitrate and placed in a furnace having a temperature of 250°C. for 5 minutes. This pyrolysis treatment converts the manganese nitrate to manganese dioxide. The composite is then again placed in the anodizing bath and subjected to a DC voltage of 30 volts for 20 minutes. After subjecting this composite to reanodization, it is reimpregnated four times with a 58 weight percent aqueous solution of manganese nitrate and each time placed in a furnace having a temperature of 200°C. After the second and fourth reimpregnation, the pellet is reanodized as previously described. A carbon layer is then applied over the manganese dioxide film by immersing the anode in an aqueous colloidal graphite suspension and drying for one-half hour at 150°C. This procedure is then repeated. Care must be taken so that the graphite does not contact the top of the anode. A silver layer is then applied over the carbon layer by dipping the composite so formed about three-fourths of its length in an air drying silver paint or suspension, that is particulate silver in an organic vehicle such as Dupont 7059 produced by the E. I. duPont de Nemours and Co., Inc. This coating is then dried for one-half hour in air and then dried in a furnace at 150°C for one-half hour. The finished capacitor is then encapsulated. This finished capacitor has characteristics and stablity qualifying it for operation at 20 volts and has the capacitance of 27 $\mu F$.

A capacitor made by the conventional one temperature processing having a 27 $\mu F$ and 20 volt rating would require more than twice the weight of tantalum used in the above unit. Furthermore, a capacitor made in accordance with the present method results in a manganese dioxide film having good adherence to the anodized tantalum surface.

Although the present invention has been described with respect to details of certain embodiments thereof, it is not intended that such details be limitations upon the scope of the invention except insofar as set forth in the following claims.

We claim:

1. The method of forming a solid tantalum capacitor comprising the steps of providing a porous tantalum slug, anodizing the surface of said tantalum slug to form a dielectric layer thereon, depositing a coating of manganese nitrate over said dielectric layer, heating the composite so formed to a temperature of between 225°C. and about 300°C. for a period of time sufficient to convert said manganese nitrate to a layer manganese dioxide, then subjecting said composite to reanodization, depositing a second coating of manganese nitrate over the exposed surface of said composite, and reheating said composite at a temperature of between 175°C. and 225°C. for a period of time sufficient to convert said second coating of manganese nitrate to manganese dioxide, said reheating temperature being at least 25°C. less than the first heating temperature.

2. The method of claim 1 further comprising the steps of applying a layer of carbon over the manganese dioxide coating and a layer of silver over the carbon layer.

3. The method of claim 2 further comprising the step of attaching a lead to said silver layer.

4. The method of claim 3 further comprising the step of encapsulating the composite so formed.

5. The method of claim 1 wherein the step of subjecting said composite to reanodization comprises placing the composite in the anodization bath and passing therethrough a DC current at substantially the same level as used during the anodizing step.

6. The method of claim 1 further comprising the step of subjecting said composite to reanodization after said reheating step.

7. The method of claim 1 further comprising the steps of depositing a still further coating of manganese nitrate over the exposed surface of said composite, and thereafter reheating said composite at a temperature of between 175°C. and 225°C. for a period of time sufficient to convert said still further coating of manganese nitrate to manganese dioxide, said latest reheating temperature being at least 25°C. less than the first heating temperature.

8. The method of claim 7 further comprising the step of subjecting said composite to reanodization after said last reheating step.

* * * * *